Aug. 25, 1959 K. M. HARDER 2,901,105
DEVICE FOR THE TOLERANCE TESTING AND GRADING INTO
TOLERANCE CATEGORIES OF OBJECTS AND WORKPIECES
Filed Dec. 10, 1954
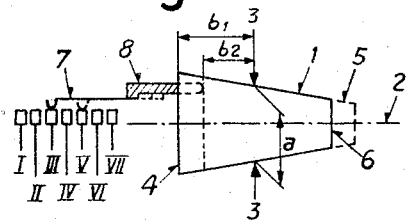
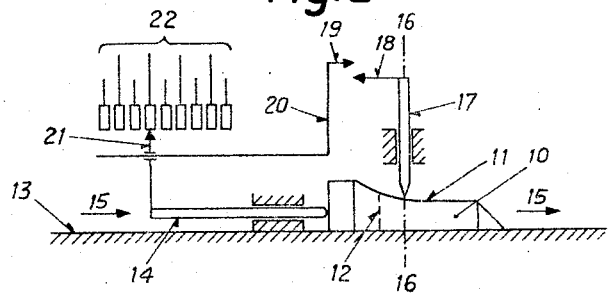
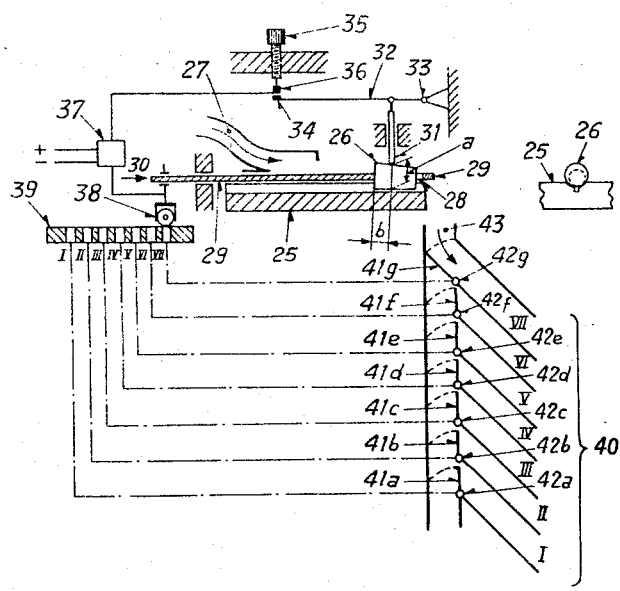
INVENTOR:
KARL MAX HARDER

United States Patent Office 2,901,105
Patented Aug. 25, 1959

2,901,105

DEVICE FOR THE TOLERANCE TESTING AND GRADING INTO TOLERANCE CATEGORIES OF OBJECTS AND WORKPIECES

Karl Max Harder, Vaduz, Liechtenstein, assignor to Patent- und Versuchs-Anstalt, Vaduz, Liechtenstein, a company of Liechtenstein Application December 10, 1954, Serial No. 474,516

Claims priority, application Switzerland December 31, 1953

1 Claim. (Cl. 209—88)

The present invention relates to a method and devices for the tolerance testing and grading into tolerance categories of objects and workpieces, particularly those which are at least in certain parts conical, or have inclined or curved tapered surfaces.

It is well known that in the mass production of various objects and workpieces the latter often require testing with respect to one or more geometrical dimensions to determine that they are within permissible limits and to be graded into tolerance categories. When exacting demands are made of the accuracy and the speed of the testing, however, the methods and devices known hitherto are most complicated, particularly for objects which are conical or tapered in shape or have inclined surfaces.

The present invention aims at eliminating these drawbacks and relates to a method for the tolerance testing and grading into tolerance categories of objects, particularly workpieces, which are conical at least at one end and at least in certain parts, the said workpieces being tested and graded in respect of a geometrical dimension of the conical part. The invention is characterized by the fact that the tolerance testing of the geometrical dimension is effected on the test piece by means of two measuring members which are independent of each other. Here, the one measuring member defines the theoretical value of the geometrical dimension to be examined and gives the position of the said dimension on the test piece.

This method is applied according to the invention with the aid of a device which is characterized by two measuring members independent of each other. The first measuring member is provided with means to define the theoretical value of the geometrical dimension to be examined and additional means to locate the position of this theoretical value on the test piece. The other measuring member possesses means to determine the deviation of this position from the theoretical position on the test piece. In this way each test piece may be compared with a perfect test piece.

In the following, a few typical embodiments of the invention are described in detail in conjunction with Figs. 1 and 2. In the attached drawing:

Figs. 1 and 2 are each diagrammatic representations designed to explain the method according to the invention.

Fig. 3 is a diagrammatic reproduction of a typical embodiment of the device according to the invention.

It is intended to explain the method according to the invention with the aid of Fig. 1. The latter shows a body having a tapered surface extending about an axis of the body, the body being in the form of a rotationally symmetrical conical roller 1 with an axis 2. As is customary with frusto-conical members or conical rollers of this type, tolerance testing should be effected on the conical parts in relation to a geometrical dimension, for instance the diameter $a$ in the plane 3—3 vertical to the cone axis 2.

The tolerance testing in relation to the geometrical dimension $a$ is effected according to the invention by two measuring members which are independent of each other and are hereinafter designated theoretical value measuring member and tolerance measuring member. The first named member is arranged in the plane 3—3 and serves to define the theoretical value of $a$. This theoretical value measuring member has the task of locating the position of the theoretical value $a$ along the cone axis 2 on each test piece. In the case of the conical roller 1 the postion of the theoretical value $a$ is, by way of example, the distance $b_1$ away from the front surface 4, whereas in the case of conical roller 5 this distance has the value $b_2$. This difference between the theoretical position $b_1$ and the position of the theoretical value $b_2$ on each test piece is ascertained by means of the tolerance measuring member. If, for instance, a diameter gauge is used as theoretical value measuring member, the penetration depth $b$ of the test piece into the diameter gauge will therefore be determined by means of the tolerance measuring member. Here, of course, instead of using the front surface 4 for determining the distance from the plane 3—3, which is here identical with the position of the theoretical value on the test piece, it is just as possible to use the rear surface 6 or any other characteristic point that can be reproduced on all the test pieces, such as a hole, rib, mark or the like.

The present method requires, therefore, that the tolerance measuring member be absolutely dependent on the position of the test piece relative to the theoretical value measuring member. Appropriately—but not necessarily—the deviation of the position of the theoretical value on the test piece from the theoretical position is ascertained by the tolerance measuring member, i.e. in the example according to Fig. 1 the deviation $\Delta b = b_1 - b_2$, which may be positive or negative.

In a preferred embodiment of the method according to the invention deviation $\Delta b$ of the penetration depth is ascertained by a tolerance measuring member having a contact arm 7 (Fig. 1) which is dependent, via a coupling piece 8, on the position of the test piece vertical to the plane 3—3 of the theoretical value measuring member. This contact arm 7 slides over a plurality of contacts I to VII which are insulated from one another and are here arranged one behind the other in the direction of the cone axis. The distance between the contacts and their width is chosen such that each contact corresponds to one of the stated tolerance categories into which the deviation $\Delta b$ is subdivided. If desired, contacts of varying width or several contacts connected in parallel may also be provided to form tolerance categories of varying $\Delta b$ ranges. Each contact from I to VII forms part of a contact circuit and suitable measures are taken to see that only that contact circuit is excited whose contact touches the contact arm 7 at the precise moment when the theoretical value on the test piece is reached. In Fig. 1, for instance, it is contact III in the case of test piece 1 and contact V in the case of test piece 5. The contact circuit which has been excited can then be used in known manner to indicate the tolerance category ascertained or can so actuate a grading device that the test piece is automatically allotted to the tolerance category ascertained.

Fig. 2 shows an embodiment of the method according to the invention for the tolerance testing of a body 10 having at one end an arched or tapered contour 11 on which, for instance, the geometrical dimension 12 has to be examined. For this purpose, the test piece 10 is moved axially along a predetermined path on the measuring table 13 in the direction of arrow 15 by the slide or pusher 14 and during this movement the contour to be examined 11 of the test piece 10 is traced in the plane 16—16 by a theoretical value measuring member with a longitudinally movable feeler pin 17 having a bottom tip engaging piece 10. The pointer 18 of the feeler pin 17 runs along a dial on which a theoretical value mark 19 is provided. On reaching this mark 19, the pointer 18 releases a theoretical value signal which therefore indicates the position of the test piece 10 relative to the plane 16—16 of the theoretical value measuring member at the moment when the theoretical value is reached and thus enables the position of the theoretical value on the test piece to be determined. The theoretical value signal, released when the mark 19 is reached, can be of any desired type and may appear in a mechanical, optical, electrical or other form. As indicated by the connection 20, the signal is conveyed to the tolerance measuring member with the contact arm 21. This tolerance measuring member is absolutely dependent on the position of the test piece 10 during the feed movement in the direction of arrow 15 and is, for instance, mechanically coupled to the slide 14. During the feed movement of the test piece 10 relative to the plane 16—16 of the theoretical value measuring member, the contact arm 21, as already described in conjunction with Fig. 1, slides over a contact bank 22 which is designed like a row of commutators, and is arranged to correspond to the stated tolerance categories. When the theoretical value signal appears on the connection 20, the contact arm 21 is located on one single contact of the bank 22 and conveys the theoretical value signal to this contact circuit which causes the thus ascertained tolerance category of the test piece to be indicated or actuates a suitable grading device.

The two typical embodiments of the method according to the invention described in conjunction with Figs. 1 and 2 thus have a theoretical value measuring member to define the theoretical value of the geometrical dimension to be examined and to locate the position of this theoretical value on the test piece, while the second, so-called tolerance measuring member ascertains the deviation of this position from the theoretical position and grades this deviation into tolerance categories. This method of testing can, of course, also be performed differently and on other objects with at least one oblique surface or contour.

A typical embodiment of a device for applying the method as explained in conjunction with Fig. 2, is illustrated diagrammatically in Fig. 3 and is designed for the fully automatic tolerance testing and grading into tolerance categories of conical rollers. The device consists here of support in the form of a measuring table 25 having a trough-like guide of triangular section forming a path of movement for the body being tested. The test pieces 26 are fed along a conveyor 27 one after the other with their conical points leading; they pass into a recess 28 of a broad, flat pusher or slide 29 and are pushed by the latter along the measuring table 25 in the direction of arrow 30. Pusher 29 thus forms a longitudinally extending means for moving the body 26. During this movement, each test piece 26 passes the theoretical value measuring member which here consists of the vertically movable feeler pin 31 which forms a feeler means extending and movable in a direction transverse to the path of movement of the body 26 and which is secured via a flexible joint to the lever 32 and, in its vertical movements, swivels the lever 32 about the stationary pivot 33. The free end of the lever 32 supports a movable contact 34, the vertical movement of which depends on the feeler pin 31 and is increased by the amount of leverage available. Opposite the contact piece 34 there is a stationary counter-contact 36 which is vertically adjustable by means of set screw 35 and is connected to a signal unit 37. Elements 34 and 36 form a transverse measuring means for measuring when the bottom tip end of feeler 31 is at a predetermined distance from the path of movement of body 26 equal to a transverse dimension of body 26 less than its maximum transverse dimension. In addition to this theoretical value measuring member there is a tolerance measuring member which consists of the movable contact roller 38, secured to the slide 29, and the row of stationary contacts forming the contact bank 39. Elements 38 and 39 form a longitudinal measuring means for measuring the position of pusher 29. The contact roller 38 is connected to the signal unit 37 so that, as described above in conjunction with Fig. 2, a theoretical value impulse released from the contacts 34, 36 in the signal unit 37 reaches one of the contact circuits I to VII of the contact bank 39. At this time the position of body 26 may be compared with the position of a perfect body 26. All the contact circuits lead to a grading unit 40, arranged here by way of example for seven tolerance categories I to VII, the grading channels I to VII of which unit are in a vertical row and each equipped with an entrance door or reversing plate 41a to 41g. These reversing plates can each be swivelled inwards about a fulcrum 42a to 42g, as illustrated by reversing plate 41g in Fig. 3. In this way, a test piece 26, on leaving the tester by falling from the edge at the end of the measuring table 25, is allotted from the grading channel 43 to that tolerance category whose reversing plate 41 is actually reversed. The reversing plates 41a to 41g are each actuated by one of the contact circuits I to VII.

In the device according to Fig. 3, therefore, the tolerance testing is also effected by determining the position $b$ of the theoretical value $a$ on the test piece, this position $b$ being simultaneously graded into various tolerance categories, according to the deviation $\Delta b$ from the theoretical position $b$ of the theoretical value $a$ on the standard conical roller.

Having now particularly described and ascertained the nature of my said invention and in what manner the same is to be performed, I declare that what I claim is:

An apparatus for measuring a tapered surface extending about an axis of a body and for comparing the latter with a perfect body; comprising a support for said body provided with a guide surface forming a path of movement of said body in the general direction of said axis, a slide having a recess therein, said slide extending longitudinally of said path and continuously shiftable in the longitudinal direction of said path, said recess receiving said body for advancing the latter continuously along said path, a plurality of stationary electric contacts arranged close to each other in a row parallel to said path, a first movable electric contact carried by said slide and movable with the latter and along said row of contacts for measuring the position of said slide with respect to said path, a feeler extending in transverse direction to said path and said slide and having a feeler tip for contacting said tapered surface of said body, means guiding said feeler for movement in said transverse direction, said feeler being moved in said transverse direction by said tapered surface as said body is advanced along said path by said slide, a second movable electric contact carried by and movable with said feeler, an additional stationary contact located in the path of movement of said second movable contact to be engaged thereby when said feeler tip contacting said tapered surface is at a predetermined distance from said guide surface equal to a dimension of said tapered surface transverse to said guide surface but less than the maximum transverse dimension of said tapered surface, a plurality of compartments arranged in a vertical row below and in front of said path, each of said compartments having an entrance door movable from a closed position to an open position in the path of a falling body for intercepting the body and directing it into a compartment, said compartments corresponding respectively to the contacts of said row of contacts, and means for automatically opening the door of that compartment which corresponds to the contact of said row of contacts engaged by said first movable contact when said second movable contact engages said additional stationary contact.

References Cited in the file of this patent

UNITED STATES PATENTS

| | | |
|---|---|---|
| 1,472,589 | Ellis | Oct. 30, 1923 |
| 1,826,527 | Schlaupitz | Oct. 6, 1931 |
| 2,523,555 | Boosey | Sept. 26, 1950 |

FOREIGN PATENTS

| | | |
|---|---|---|
| 499,537 | Belgium | Dec. 15, 1950 |
| 283,468 | Switzerland | June 15, 1952 |
| 683,177 | Great Britain | Nov. 26, 1952 |